(12) United States Patent
Kottilingam et al.

(10) Patent No.: US 8,444,377 B2
(45) Date of Patent: May 21, 2013

(54) METHOD FOR ATTACHING A CONNECTOR TO DEPOSITED MATERIAL

(75) Inventors: Srikanth Chandrudu Kottilingam, Simpsonville, SC (US); Glen Alan Aussiker, Hillsboro, TN (US); Canan Uslu Hardwicke, Simpsonville, SC (US); Kurt Kramer Schleif, Greenville, SC (US)

(73) Assignee: General Electric Company, Schenectady, NY (US)

( * ) Notice: Subject to any disclaimer, the term of this patent is extended or adjusted under 35 U.S.C. 154(b) by 808 days.

(21) Appl. No.: 12/574,814

(22) Filed: Oct. 7, 2009

(65) Prior Publication Data

US 2011/0081229 A1 Apr. 7, 2011

(51) Int. Cl.
*F01B 25/26* (2006.01)

(52) U.S. Cl.
USPC ............................. 415/118; 416/61; 416/230

(58) Field of Classification Search
USPC .................. 415/118; 416/61, 62, 229 R, 230, 416/229 A
See application file for complete search history.

(56) References Cited

U.S. PATENT DOCUMENTS

| | | | | |
|---|---|---|---|---|
| 2,008,234 A | * | 7/1935 | Weeks | 416/233 |
| 5,141,391 A | * | 8/1992 | Acton et al. | 415/119 |
| 5,425,278 A | * | 6/1995 | Perkins | 73/862.632 |
| 6,576,861 B2 | | 6/2003 | Sampath et al. | |
| 7,004,622 B2 | | 2/2006 | Hardwicke et al. | |
| 7,302,990 B2 | | 12/2007 | Bunker et al. | |
| 7,351,290 B2 | | 4/2008 | Rutkowski et al. | |
| 7,360,437 B2 | | 4/2008 | Hardwicke et al. | |
| 7,368,827 B2 | | 5/2008 | Kulkarni et al. | |
| 2004/0114666 A1 | | 6/2004 | Hardwicke et al. | |
| 2004/0121182 A1 | | 6/2004 | Hardwicke et al. | |
| 2005/0011551 A1 | * | 1/2005 | Simburger et al. | 136/244 |
| 2005/0029236 A1 | | 2/2005 | Gambino et al. | |
| 2005/0198967 A1 | * | 9/2005 | Subramanian | 60/803 |
| 2006/0288794 A1 | * | 12/2006 | Hardwicke et al. | 73/763 |
| 2007/0095756 A1 | | 5/2007 | Hardwicke et al. | |
| 2008/0003353 A1 | | 1/2008 | Hardwicke et al. | |
| 2008/0181777 A1 | * | 7/2008 | Bailey | 416/117 |

FOREIGN PATENT DOCUMENTS

| | | | |
|---|---|---|---|
| DE | 2064141 A | * | 10/1978 |
| FR | 2568684 A | * | 2/1986 |
| WO | 2004013900 A2 | | 2/2004 |
| WO | 2004044672 A2 | | 5/2004 |

OTHER PUBLICATIONS

Avramchenko et al, The Pulsed Laser Welding of Conductors to Films in the Manufacture of Micro-Devices, 1974, Avt. Svarka, No. 5, pp. 24-26.*

Direct Write Thermal Spray, 3D Digital Printing of Electronics and Sensors, MesoScribe Technologies, 2009, [retrieved Sep. 23, 2009], http://www.mesoscribe.com/ver2/content/090204_mst_brochure_online%20r1.pdf.

* cited by examiner

*Primary Examiner* — Nathaniel Wiehe
*Assistant Examiner* — Adam W Brown
(74) *Attorney, Agent, or Firm* — Cantor Colburn LLP

(57) ABSTRACT

A method for attaching a connector to deposited material includes the steps of depositing material on a substrate using a thin- or thick-film deposition process and attaching at least one connector to the deposited material using a high energy beam welding process.

13 Claims, 2 Drawing Sheets

METHOD FOR ATTACHING A CONNECTOR TO DEPOSITED MATERIAL

BACKGROUND OF THE INVENTION

The subject matter disclosed herein relates to gas turbines and, more particularly, to measurements of various properties of components within gas turbines using deposited sensors.

Measurement of gas turbine hot gas path component (e.g., turbine) temperatures typically has provided a relatively good tool for design engineers to validate their component design models, usually during gas turbine testing. In known test methods, some selective component parts are "instrumented" by attaching thermocouples or other types of property measurement devices or sensors (e.g., strain gauges) at specific component locations, and metal temperatures or other component properties (e.g., strain) are acquired or sensed.

It is advantageous to have the sensing instrumentation located on the component at all times to acquire real time data during the entirety of gas turbine operation. Moreover, gas turbine hot gas path components such as turbine airfoils and nozzles typically have coatings on them, which creates a challenge for attaching the sensor lead wires to the sensor itself. The coatings are used to protect the underlying component substrate from the relatively high operating temperatures that the components are exposed to. Also, advances have been made in the field of depositing sensors onto the coated surfaces of the hot gas path components using, for example, a "direct-write" method (e.g., thermal spraying). However, difficulties exist in adequately attaching the sensor lead wires to the sensors deposited on the gas turbine components by these direct-write methods. Known resistance spot welding techniques tend to be relatively unreliable and also pose component access limitations. In addition, various types of conventional welding or brazing techniques create welds or brazes that may break or crack when subjected to, e.g., high temperatures—particularly, a wide range of temperatures and long term cycles.

BRIEF DESCRIPTION OF THE INVENTION

According to one aspect of the invention, a method for attaching a connector to deposited material includes the steps of depositing material on a substrate using a thin- or thick-film deposition process and attaching at least one connector to the deposited material using a high energy beam welding process.

According to another aspect of the invention, a gas turbine airfoil includes one or more sensor elements deposited on or within a surface of the airfoil using a direct-write technique. The airfoil further includes a corresponding lead-wire attached to each of the corresponding one or more sensor elements using pulsed laser welding.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
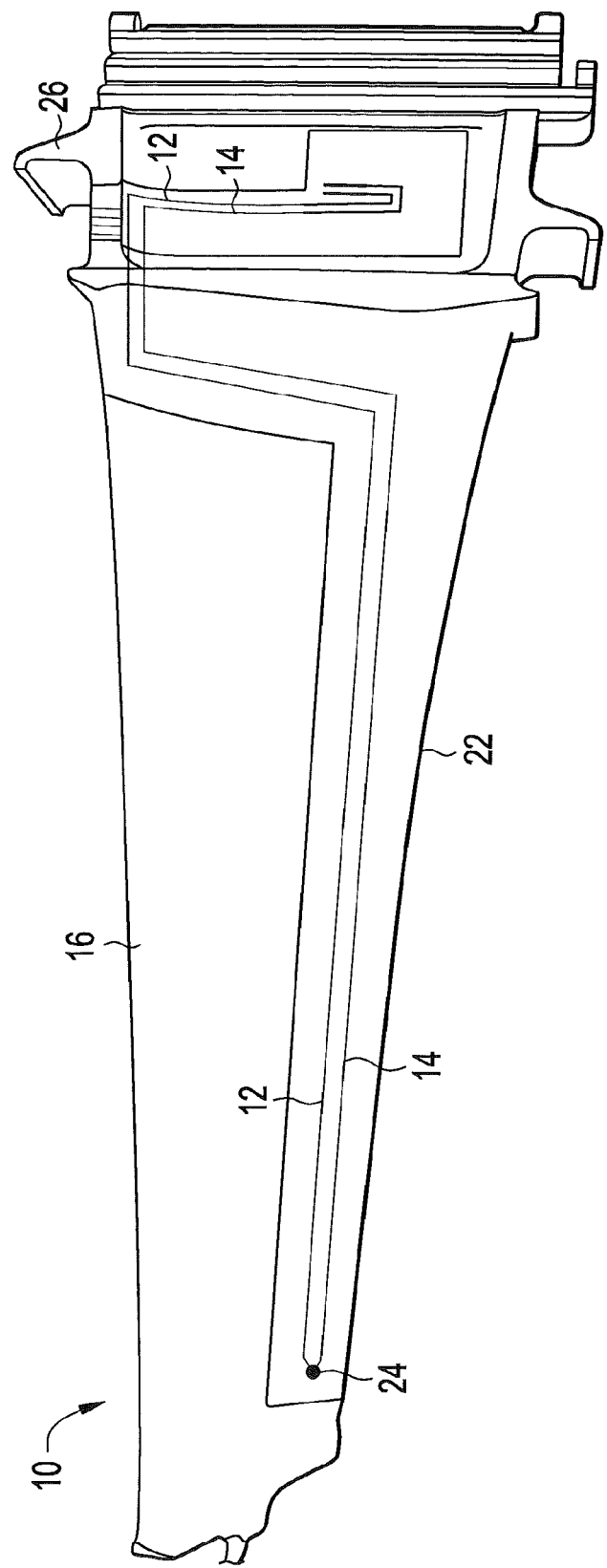
FIG. 1 is a top view of a gas turbine airfoil having deposited sensor elements thereon prior to attachment of lead-wires to the deposited sensor elements in accordance with an embodiment of the present invention.

In FIG. 1 is a gas turbine airfoil 10 having one or more sensor elements 12, 14 deposited on or within a surface 16 of the airfoil 10 prior to attachment of external lead-wires 18, 20 (FIG. 2) to the deposited sensor elements 12, 14 in accordance with an embodiment of the present invention. The sensor elements 12, 14 may be deposited onto or within the airfoil surface 16 using a known thin-film or thick-film deposition method, such as a direct-write process, for example, thermal spray deposition, cold spray deposition, paste deposition, electron beam deposition, plasma deposition, laser deposition, or other mask-less deposition processes. Other non-direct-write deposition methods may be used, such as, for example, masked deposition (e.g., physical vapor deposition (PVD), thermal spray, chemical vapor deposition (CVD), etc.).

The airfoil 10 may comprise a known "superalloy" metal and be part of a turbine section of a gas turbine, and thus may be part of the "hot gas path" of the gas turbine in which the airfoil 10 is exposed to relatively high temperatures during typical gas turbine operation. The superalloy metal may comprise a nickel-, iron- nickel-, or cobalt-based superalloy. The deposited sensor elements 12, 14 may comprise a thermocouple for measuring temperature of the airfoil 10. However, other types of deposited sensors may be utilized, for example, RTDs (resistive temperature devices), strain gauges (e.g., resistive or capacitive types) for measuring the strain imposed on the airfoil 10 during gas turbine operation, or sensors for measuring properties of the airfoil 10 such as creep characteristics, crack initiation and crack growth, fatigue, and electrical resistivity. The deposited sensor elements 12, 14 may comprise a combination thermocouple and strain gauge. The deposited sensors may comprise a thin- or thick-film deposition, the thickness of the deposition being typically dictated by the application. The thermocouple may comprise a Type "K" thermocouple, which typically includes the pair of sensor elements 12, 14 comprising dissimilar materials such as alumel 12 and chromel 14. Other types of thermocouples (e.g., types "N," "R," "S," "B") having associated deposited dissimilar material sensor elements 12, 14 (e.g., platinum-rhodium alloys) may be utilized within the ordinary skill in the art.

Figure 2:
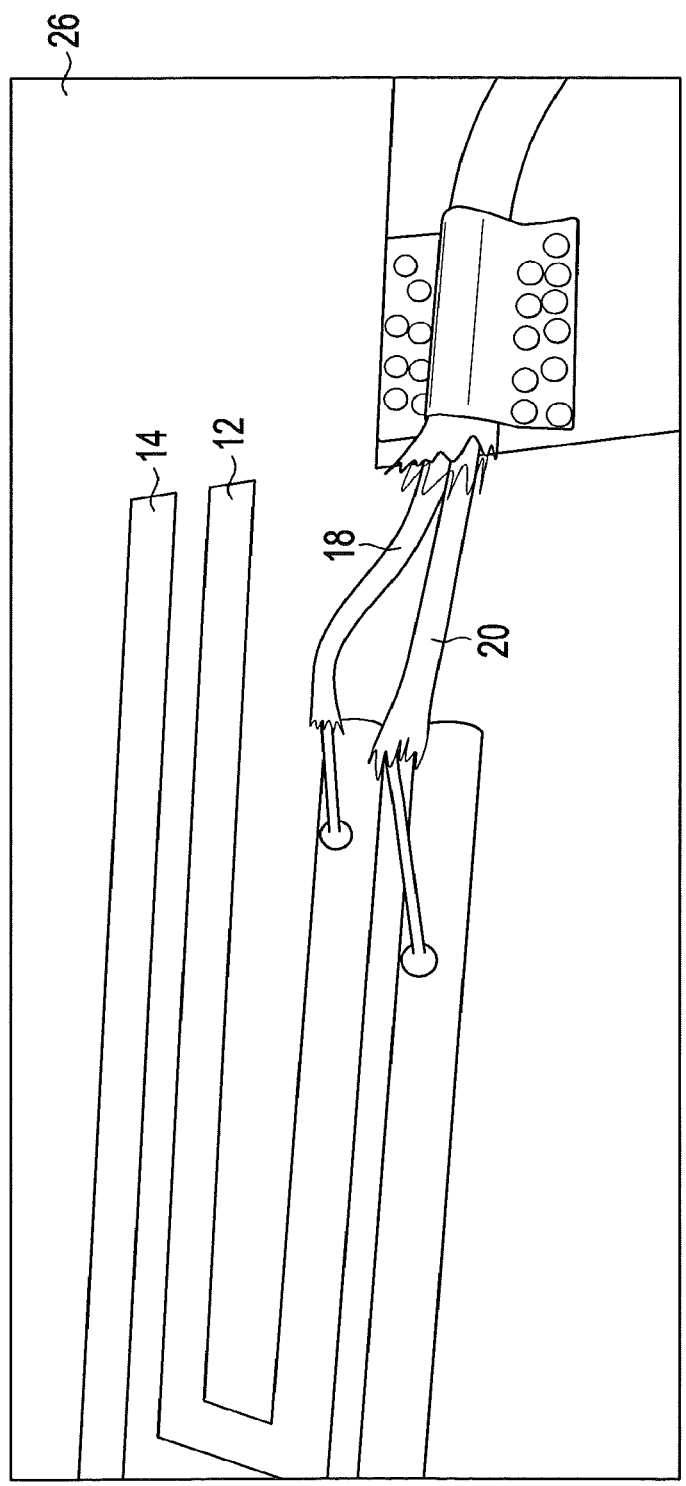
FIG. 2 is a detailed top view of the lead-wires attached to the corresponding deposited sensor elements on the airfoil in accordance with an embodiment of the present invention.

The pair of electrically conductive sensor elements 12, 14 may run along a length of the airfoil 10 near a leading edge 22 of the airfoil 10. Near the tip of the airfoil 10, the sensor elements 12, 14 may terminate or form a junction at a connection point 24 on the surface 16 of the airfoil 10. The sensor elements 12, 14 may then pass through the interior of the blade 10 and connect to lead-wires. At the root portion 26 of the airfoil 10, the pair of sensor elements 12, 14 connect to external lead wires 18, 20 (FIG. 2). Additional sensing elements may be deposited on or within the surface 16 of the airfoil 10 in a manner similar to the deposited sensor elements 12, 14 using a known deposition method such as direct-write by thermal spraying, or other, non-direct-write (i.e., masked) methods, as mentioned hereinabove. The deposited sensor elements 12, 14 may carry electrical signals to/from the lead-wires 18, 20 in a known manner (e.g., by a varying electrical current). The electrical lead-wires 18, 20 may connect to the corresponding sensor elements 12, 14 using a high energy beam welding process, in accordance with embodiments of the invention, as described and illustrated in detail hereinafter with respect to FIG. 2.

As described hereinabove, the sensor elements 12, 14 may be deposited on or within the surface 16 of the airfoil 10 using a known deposition method such as a direct-write method, e.g., thermal spraying or other direct-write methods. Direct-write methods may be used to deposit various materials such as metals, ceramics, polymers (e.g., thermoplastic or thermosetting materials), etc. in two or three dimensions onto or within (i.e., embedded) surfaces of various components, including gas turbine components. The deposited materials may be deposited in one or more layers and are typically compatible with the materials used as coatings on, e.g., airfoils. Known thermal spraying methods may be used to deposit powdered materials onto or within components surfaces.

As mentioned, various and numerous direct-write techniques are known in the art and typically comprise a process in which a powder or liquid, liquid suspension, or paste (higher material loading) is deposited onto a surface by ejecting the material through an orifice toward the surface, using a suitable direct-write tool (e.g., a pen) without use of any masking. Usually, the tool itself does not make substantial contact with the surface. The direct-write tool may be controllable over an x-y grid relative to the printed surface (i.e., either or both the substrate and the device may move). In general, the deposition materials for direct-write techniques can include a wide variety of metal, ceramic, or polymeric powders. The powder may be uniformly distributed in a solvent, forming a slurry or "ink" in a paste method, or in thermal spraying, the powder may be accelerated through a heat source. Various additives may also be present. The dry powder or slurry or ink may be applied directly onto any type of substrate, in an automated technique. Usually, a CAD/CAM interface is employed to program a desired pattern for the deposition.

The direct-write techniques may include a thermal spray technique, which include high velocity oxy-fuel (HVOF) techniques, and plasma processes, such as vacuum plasma deposition (VPS). HVOF is a continuous combustion process in which the powder is injected into the jet stream of a spray gun at very high speeds. Various HVOF details include selection of primary gasses, secondary gasses (if used), and cooling gasses, gas flow rates, power levels, coating particle size, and the like. This process may be used to deposit the sensor elements 12, 14, in an embodiment of the present invention.

In a typical plasma process, a generic DC (direct current) thermal plasma torch is employed, providing a stable electric arc between a cathode and an annular, water-cooled copper anode. A plasma gas (often argon or another inert gas) is introduced at the back of the spray gun interior. The gas swirls in a vortex, and then exits out of the front of the anode nozzle. The electric arc from the cathode to the anode completes the electric circuit, forming an exiting plasma flame. Plasma temperatures can be relatively high, e.g., 15,000K for a conventional DC torch operating at 40 kW. The ceramic material being deposited onto a substrate is supplied in powder form. The powder is introduced into the plasma flame. The powder particles are accelerated and melted in the flame, on a high-speed path to the substrate, where they impact and undergo rapid solidification. Variations may exist in the general plasma spray process, and the process may be adapted to a variety of deposition materials.

Another direct-write technique is laser chemical vapor deposition (LCVD), which is a thermal technique for film growth. A laser is employed as an activator of a precursor for the ceramic that is photolyzed, pyrolyzed, or vibrationally/rotationally excited. The technique can be used to form complex structures on a substrate, by "mass-addition". The material deposition can be carried out under computerized motion control, as in other direct-write processes.

Another common direct-write technique is based on ink-jet techniques. Various ink jet systems can be employed, e.g., continuous mode systems and demand-mode (e.g., impulse) systems. Within the latter category, there are various types of impulse systems as well, e.g., piezoelectric systems and thermal impulse systems. The electronic control mechanisms for ink jet systems are also known in the art. Various computer-control systems can be employed, e.g., using a CAD/CAM interface in which the desired pattern of deposition is programmed.

The requirements for ink compositions can usually be aqueous or solvent-based. In addition to some of the additives mentioned above, ink jet compositions may contain other ingredients, which are somewhat particular to this deposition method. For example, humectants and selected co-solvents may be use to inhibit drying of ink in the nozzles. The composition of the ceramic slurries used according to this disclosure can be readily adjusted to be compatible with ink jet deposition.

Another direct-write technique is laser-guided direct writing (LGDW). In a typical process of this type, a stream of deposition particles is produced. The particles are constrained by a laser beam, and directed onto a selected region of the substrate. The particles often originate as suspensions, e.g., a suspension in water. In some instances, ultrasonic atomization is used to spread the particles in the atmosphere, for contact with the laser beam. The laser particle guidance systems typically include various positioning mechanisms, which are computer-driven to direct the pattern of deposition.

Another type of direct-write technique utilizes a pen-dispensing system. These systems often use automated syringes, and are sometimes generally referred to as "micropen printing" processes. Some of the process factors mentioned above in the other direct-write techniques are relevant to the pen-dispensing system, such as the rheology of the printing paste or ink, as well as its wetting and adhesion characteristics.

The sensor elements 12, 14 may also be deposited using various, known non-direct-write methods, such as, for example, vacuum deposition, a masked process where a mask is used to process the desired sensor element pattern and then removed, or mask-less deposition.

In FIG. 2 is the root portion 26 of the gas turbine airfoil 10 of FIG. 1 showing the extension lead-wires 18, 20 attached to the corresponding deposited sensor elements 12, 14 using various high energy beam welding processes in accordance with embodiments of the present invention. Although not shown, the lead-wires 18, 20 may attach to the sensor elements 12, 14 in another portion of the airfoil surface 16. The other ends of the lead-wires (not shown) may connect with a data acquisition system that may process the sensed property (e.g., temperature) sensed by the sensor elements 12, 14 deposited on or within the airfoil surface 16.

In this exemplary embodiment, the lead-wires 18, 20 may be attached using a commercially available pulsed laser welding system. This laser is a type of relatively high power laser (e.g., 200 W mean power, 9 kW peak power) that emits a relatively short duration pulse (e.g., 2-9 milliseconds) of relatively small heat input, which melts the end of each lead-wire 18, 20 to connect the lead-wires 18, 20 to the deposited sensor elements 12, 14 after the lead-wires 18, 20 are each placed on the surface of the corresponding deposited sensor element 12, 14 at an appropriate location. The pulsed laser welding system utilized in embodiments of the present invention may be movable or portable so as to facilitate the welding of the lead-wires 18, 20 to the sensor elements 12, 14. The resulting laser welds are able to withstand the typically relatively high temperatures that a gas turbine hot gas path section routinely encounters during normal operation. This way, properties of the components (e.g., temperature or strain of the gas turbine airfoil 10) may be continuously gathered and used, for example, to determine proper operation of the gas turbine (e.g., within temperature limits). Other embodiments of the present invention include attachment methods other than pulsed laser welding. For example, the lead-wires 18, 20 may be attached to the deposited material using a known electron beam welding process, or a laser (i.e., non-pulsed) welding process.

In the embodiment described hereinabove and illustrated in FIGS. 1-2, the lead-wires 18, 20 attach to individual deposited sensor elements 12, 14. In addition, the embodiment described hereinabove is with respect to the sensor elements 12, 14 deposited onto or within the surface of a component (e.g., an airfoil). However, the deposited device may not comprise strictly a sensor, but may comprise any other type of deposited device where it is desired to attach one or more lead-wires or other types of conductor or non-conductor devices (e.g., a bonding or connecting element other than a lead-wire) using the pulsed laser method or other attachment methods of embodiments of the present invention. In addition, the component is not limited to an airfoil 10. The component 10 may comprise another part of a gas turbine, such as a nozzle, a combustion liner or transition piece, or shrouds. In addition, the component may be a part of any type of energy producing device, for example a wind turbine or a steam turbine.

Embodiments of the present invention provide for the reliable attachment of various types of elements to a deposited sensor or other type of deposited device without any appreciable effect on the deposited device as a result of the attachment process.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for attaching a connector to deposited material, the method comprising the steps of:
    depositing material on a superalloy substrate using a thin- or thick-film deposition process; and
    attaching at least one connector to the deposited material using a high energy beam welding process comprising pulsed laser welding with a laser power of about 200 Watts, wherein the laser emits a pulse duration ranging from about 2 milliseconds to about 9 milliseconds.

2. The method of claim 1, wherein the step of depositing material on a substrate comprising a masked deposition process.

3. The method of claim 2, wherein the masked deposition process comprising a vapor deposition process.

4. The method of claim 1, wherein the step of depositing material on a substrate comprising a direct-write process.

5. The method of claim 4, wherein the direct-write process comprising one of thermal spray deposition, cold spray deposition, paste deposition, electron beam deposition, plasma deposition, or laser deposition.

6. The method of claim 1, wherein the at least one connector comprises a lead-wire of a sensing device.

7. The method of claim 1, wherein the substrate comprises a gas turbine airfoil, the deposited material comprises a sensor, and the at least one connector comprises a lead-wire of the sensor.

8. The method of claim 7, wherein the sensor comprises a thermocouple, a strain gauge, or a combination thermocouple and strain gauge.

9. The method of claim 1, wherein the deposited material comprises one of a metal, a ceramic, or a polymer.

10. The method of claim 1, wherein the substrate comprises a gas turbine airfoil, a nozzle, a combustion liner or transition piece, or shrouds.

11. The method of claim 1, wherein the substrate comprises a component of an energy producing device.

12. The method of claim 11, wherein the energy producing device comprising a wind turbine.

13. The method of claim 11, wherein the energy producing device comprising a steam turbine.

* * * * *